(12) United States Patent
Dwyer et al.

(10) Patent No.: US 8,955,382 B2
(45) Date of Patent: Feb. 17, 2015

(54) HIGH PERFORMANCE DOUBLE-ENDED TUNING FORK

(75) Inventors: Paul W. Dwyer, Seattle, WA (US); Arthur Savchenko, Kirkland, WA (US)

(73) Assignee: Honeywell International Inc., Morristown, NJ (US)

(*) Notice: Subject to any disclaimer, the term of this patent is extended or adjusted under 35 U.S.C. 154(b) by 685 days.

(21) Appl. No.: 13/044,881

(22) Filed: Mar. 10, 2011

(65) Prior Publication Data

US 2012/0227492 A1    Sep. 13, 2012

(51) Int. Cl.
    *G01C 19/5607*    (2012.01)

(52) U.S. Cl.
    CPC ................ *G01C 19/5607* (2013.01)
    USPC ..................... 73/504.16; 73/514.34

(58) Field of Classification Search
    CPC ...... G01C 19/5607; G01L 1/10; G01L 1/162; G01P 15/097; H01L 41/047; Y10S 73/01; Y10S 73/04
    USPC ............... 73/504.16, 510, 514.01, 514.29, 73/514.34; 310/370
    See application file for complete search history.

(56) References Cited

U.S. PATENT DOCUMENTS

| | | | | |
|---|---|---|---|---|
| 3,479,536 A * | 11/1969 | Norris | ............ | 310/323.21 |
| 4,172,908 A * | 10/1979 | Shibata et al. | ............ | 427/100 |
| 4,469,979 A * | 9/1984 | Chuang | ............ | 310/370 |
| 4,531,073 A * | 7/1985 | EerNisse | ............ | 310/370 |
| 4,773,493 A * | 9/1988 | Goodier | ............ | 177/210 FP |
| 4,912,990 A * | 4/1990 | Norling | ............ | 73/862.59 |
| 4,929,860 A * | 5/1990 | Hulsing et al. | ............ | 310/366 |
| 4,939,935 A * | 7/1990 | Amand | ............ | 73/514.29 |
| 5,113,698 A * | 5/1992 | Grlj et al. | ............ | 73/862.59 |
| 5,159,301 A * | 10/1992 | Kaida et al. | ............ | 333/187 |
| 5,251,483 A * | 10/1993 | Soderkvist | ............ | 73/504.16 |
| 5,331,242 A * | 7/1994 | Petri | ............ | 310/370 |
| 5,367,217 A * | 11/1994 | Norling | ............ | 310/370 |
| 5,503,285 A * | 4/1996 | Warren | ............ | 216/2 |
| 5,644,273 A * | 7/1997 | Kaida et al. | ............ | 333/187 |
| 5,656,778 A * | 8/1997 | Roszhart | ............ | 73/504.04 |
| 5,717,140 A * | 2/1998 | Hulsing, II | ............ | 73/504.16 |
| 2,780,742 A | 7/1998 | Burns et al. | | |
| 5,780,742 A | 7/1998 | Burns et al. | | |
| 5,796,001 A * | 8/1998 | Greiff et al. | ............ | 73/504.16 |
| 6,248,610 B1 * | 6/2001 | Leonardson et al. | ............ | 438/50 |
| 6,298,723 B1 * | 10/2001 | Konno et al. | ............ | 73/504.16 |
| 6,351,891 B1 | 3/2002 | MacGugan | | |

(Continued)

OTHER PUBLICATIONS

Karl S. Van Dyke; The Piezoelectric Quartz Resonator; Proceedings of the Institute of Radio Engineers; Issue Date Apr. 1935, vol. 23 Issue 4, pp. 386-392, ISSN: 0731-5996, Digital Object Identifier: 10-1109/JRPROC.1935.227996, Date of Current Version: Sep. 6, 2006; IEEE.

*Primary Examiner* — Peter Macchiarolo
*Assistant Examiner* — Samir M Shah
(74) *Attorney, Agent, or Firm* — Shumaker & Sieffert, P.A.

(57) ABSTRACT

An accelerometer device having a proof mass, a support base, a hinge that flexibly connects the proof mass to the support base, a double-ended fork (DETF) having two tines. The tines are made of only piezoelectric material. A plurality of electrode surfaces surround at least portions of the tines for inducing electric fields at the first tine is opposite a direction of the induced electric field at the second tine at similar locations along a longitudinal axis of the tines. This causes the tines to resonate in-plane and out of phase.

19 Claims, 6 Drawing Sheets

(56) References Cited

U.S. PATENT DOCUMENTS

| | | | |
|---|---|---|---|
| 6,435,029 B1 * | 8/2002 | Hulsing et al. | 73/514.29 |
| 6,662,657 B2 | 12/2003 | Hulsing, II et al. | |
| 6,745,627 B1 * | 6/2004 | Woodruff et al. | 73/514.29 |
| 6,874,363 B1 * | 4/2005 | Foote et al. | 73/514.29 |
| 6,938,334 B2 | 9/2005 | Yu | |
| 7,024,934 B2 | 4/2006 | Yu | |
| 7,677,105 B2 | 3/2010 | Ishii | |
| 7,888,850 B2 * | 2/2011 | Ichikawa | 310/370 |
| 2008/0087083 A1 * | 4/2008 | Nishizawa et al. | 73/514.29 |
| 2008/0174208 A1 * | 7/2008 | Takahashi | 310/361 |
| 2008/0179997 A1 * | 7/2008 | Ichikawa | 310/370 |

\* cited by examiner

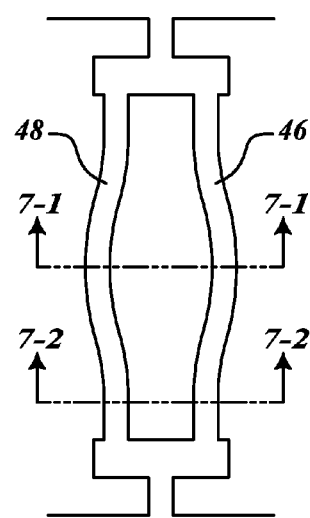
FIG. 6
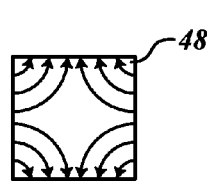
FIG. 7-1
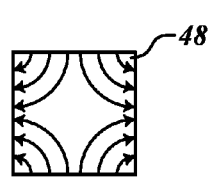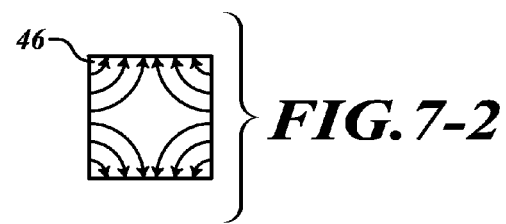
FIG. 7-2

HIGH PERFORMANCE DOUBLE-ENDED TUNING FORK

BACKGROUND OF THE INVENTION

Conventional double-ended tuning forks (DETFs) have metallization on the tines, which is used for receiving the actuation signal. Stress-relief, plastic deformation and hysteresis are inherent in the metallization components. In high-performance accelerometers the inherent features of the metallization on the tines provides a source of error in the sensed signal.

SUMMARY OF THE INVENTION

The present invention provides an accelerometer device having a proof mass, a support base, a hinge that flexibly connects the proof mass to the support base, one or more double-ended forks (DETF) having two tines. The tines are made of only piezoelectric material. A plurality of electrode surfaces surround at least portions of the tines.

In one aspect of the invention, the electrode surfaces include a bottom section located adjacent a first side of the tines, a post received between the tines, a side section located adjacent a second side of the first tine and a second side of the second tine, the side section being planar with the tines and a top section. Each of the sections and post include a plurality of electrodes. The metalized sections and post induce an electric field between the top section and the bottom section, between the side section and the top section, between the post and the bottom section, and between the post and the top section.

In another aspect of the invention, a direction of the induced electric field around the first tine is opposite a direction of the induced electric field around the second tine at similar locations along a longitudinal axis of the tines. This causes the tines to resonate in-plane and causes the tines to resonate out of phase.

In still another aspect of the invention, the metalized sections along a longitudinal axis of each of the sections and the post include three separate metalized subsections, two of the metalized subsections comprise the same electrical charge.

BRIEF DESCRIPTION OF THE DRAWINGS

Preferred and alternative embodiments of the present invention are described in detail below with reference to the following drawings:

FIG. 1-2 illustrates a perspective view of a portion of an electrodeless DETF formed in accordance with an embodiment of the present invention;

FIG. 1-3 illustrates a cross-sectional view of the DETF shown in FIG. 1-2;

FIG. 1-4 illustrates a partial cross-sectional top view of the DETF shown in FIG. 1-2;

FIGS. 2-1 through 2-3 illustrate cross-sectional views of stages in a process for forming a bottom portion of an exemplary DETF;

FIGS. 3-1 and 3-2 illustrate cross-sectional views of stages in a process for forming the tines and side electrode sections of an exemplary DETF;

FIGS. 4-1 and 4-2 illustrate cross-sectional views of stages in a process for forming an optional top portion of an exemplary DETF;

FIG. 6 is a view of a DETF in an exaggerated resonance position; and

FIGS. 7-1 and 7-2 illustrate electric field flow within the tines of the double-ended fork of FIG. 6 at various locations along the length of the tines.

DETAILED DESCRIPTION OF THE INVENTION

Figure 1:
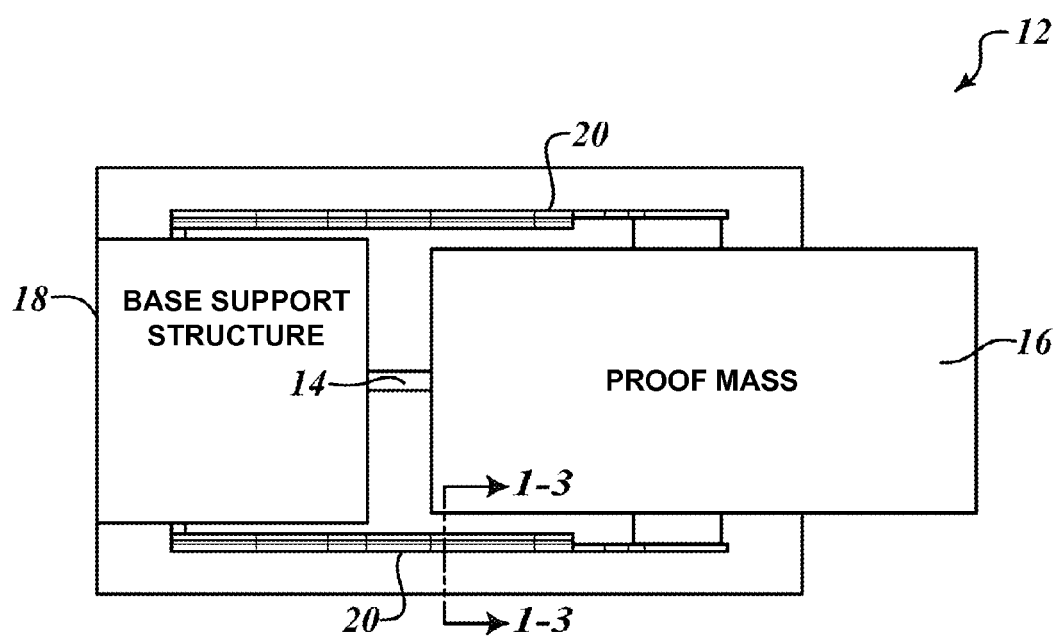
FIG. 1-1 illustrates a side view of an accelerometer that includes a pair of double-ended tuning forks (DETFs) formed in accordance with an embodiment of the present invention.

FIG. 1-1 illustrates a side view of an accelerometer 12 that includes a proof mass 16 that is flexibly attached to a base support structure 18 via a hinge 14. Connected on top and bottom surfaces of the proof mass 16, between the proof mass 16 and the support structure 18, are double-ended tuning forks (DETFs) 20 formed in accordance with an embodiment of the present invention. Not shown in FIG. 1-1 is a housing structure that surrounds the accelerometer 12 and is attached to the support structure 18.

The DETFs 20 are made of only a piezoelectric material, such as quartz ($SiO_2$), Berlinite ($AlPO_4$), gallium orthophosphate ($GaPO_4$), thermaline, barium titanate ($BaTiO_3$), or lead zirconate titanate (PZT), zinc oxide (ZnO), or aluminum nitride (AlN), etc. The electrodes are formed within the material that surrounds the tines of the DETF 20, thereby causing the tuning forks to resonate. The electrodes adjacent to the tines will see the field generated by the motion of the tines at the frequency at which they are resonating.

Figures 1, 2:
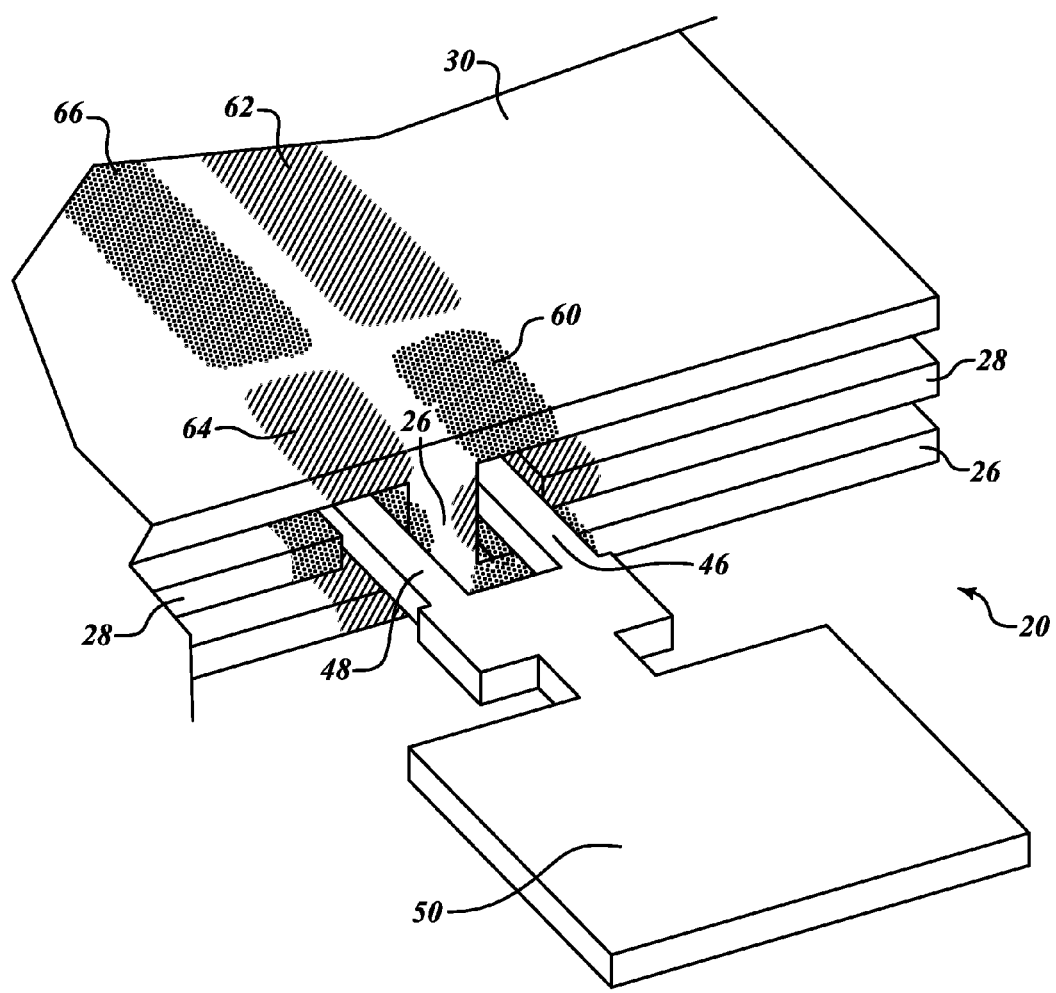

FIG. 1-2 illustrates a perspective view looking at one end of the DETF 20. The DETF 20 includes two tines 46, 48 that are attached at either end to pads 50 that are connected to either the proof mass 16 or the support structure 18 indicated in FIG. 1-1. Located below the tines 46, 48 is a base electrode layer 26 that includes a center post (shown in FIG. 2-3) that is received between the two tines 46, 48. In the same plane as the tines 46, 48 is a middle electrode layer 28. Located above the tines 46, 48 is a top electrode layer 30 that is attached to at least the center post and may also be attached to the middle electrode layer 28. Surrounding at least portions of the tines 46, 48 on the bottom layer 26, the center post, the middle layer 28, and top layer 30 are electrodes that have been applied to the surfaces of the layers 26, 28, 30 and the post adjacent the tines 46, 48. Electrodes 60-66 are located on the inner surface of the top layer 30. The application and location of the electrodes are described in more detail below. The electrode layers attach to the support structure 18 either above, below, or separately from the pads 50 of the accelerometer 20. In one embodiment, the layers are attached via direct fusion bonding to achieve the best available expansion coefficient matching. In one embodiment, the layers are attached using braze materials or epoxies. Charges are sent to the electrodes from an attached electronics via wirebonding and metallization patterns applied to the electrode support structures.

Figures 1, 2, 3:
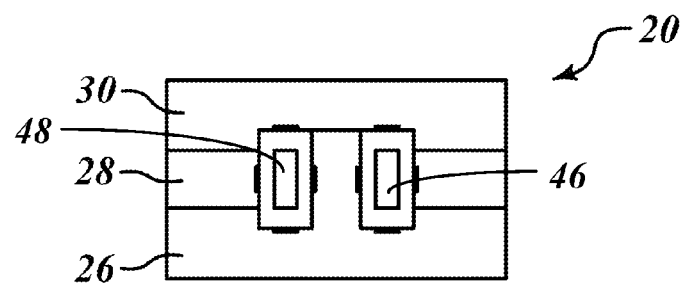

FIG. 1-3 illustrates a cross-sectional view of the DETF 20. The tines 46, 48 are located on the same plane as the middle electrode layer 28. A consistent gap exists between the tines 46, 48 and the middle layer 28, the bottom electrode layer 26, and the top electrode layer 30. The cross-sectional shape of the tines 46, 48 may be various shapes, such as a rectangle.

FIG. 1-4 shows a top partial cross-sectional view of the DETF 20. The center post 34 protrudes between the tines 46, 48. A gap is formed between the center post 34 and the tines 46, 48 that is approximately equal to the gap formed between the edges of the middle layer 28 as well as the top and bottom layers 26, 30.

FIGS. 2-1 through 2-3 illustrate an exemplary process for forming the bottom layer 26. The process begins with a block of quartz 33 that is etched to produce a post 34, see FIG. 2-2. Then, as shown in FIG. 2-3, the etched piece from FIG. 2-2 is masked and etched to produce gaps located around the post 34. These gaps are sized in order to later receive the tines 46, 48 with proper lateral and vertical gaps between the tines 46, 48 and the surface. Then, metallization 38 is applied to the bottoms of the grooves that were just etched, and metallization 36 is applied to the sides of the post 34, applied using standard metallization techniques.

FIGS. 3-1 and 3-2 illustrate a side cross-sectional view for forming the tines 46, 48 and the middle electrode layer 28 out of a single layer of quartz 35. A masking and etching process is performed in order to etch away the material between the tines 46, 48 and the area outside of the tines 46, 48 to provide the proper gap between the tines 46, 48 and the side walls of the middle electrode layer 28. Next, metallization is applied to the side walls of the middle electrode layer 28 adjacent the tines 46, 48. Metallization is not applied to either of the tines 46, 48. In one embodiment, the tines 46, 48 are first deflected away from the adjacent side walls, then the metallization is applied to those side walls without getting any material on the tines 46, 48. In one embodiment, a pressure is applied to the tines 46, 48 in order to deflect them away from the side walls to be metalized. In another embodiment, a very thin shadow mask is placed over the tines 46, 48 in order to shield them during the metallization process.

Figures 1, 2, 3, 4:
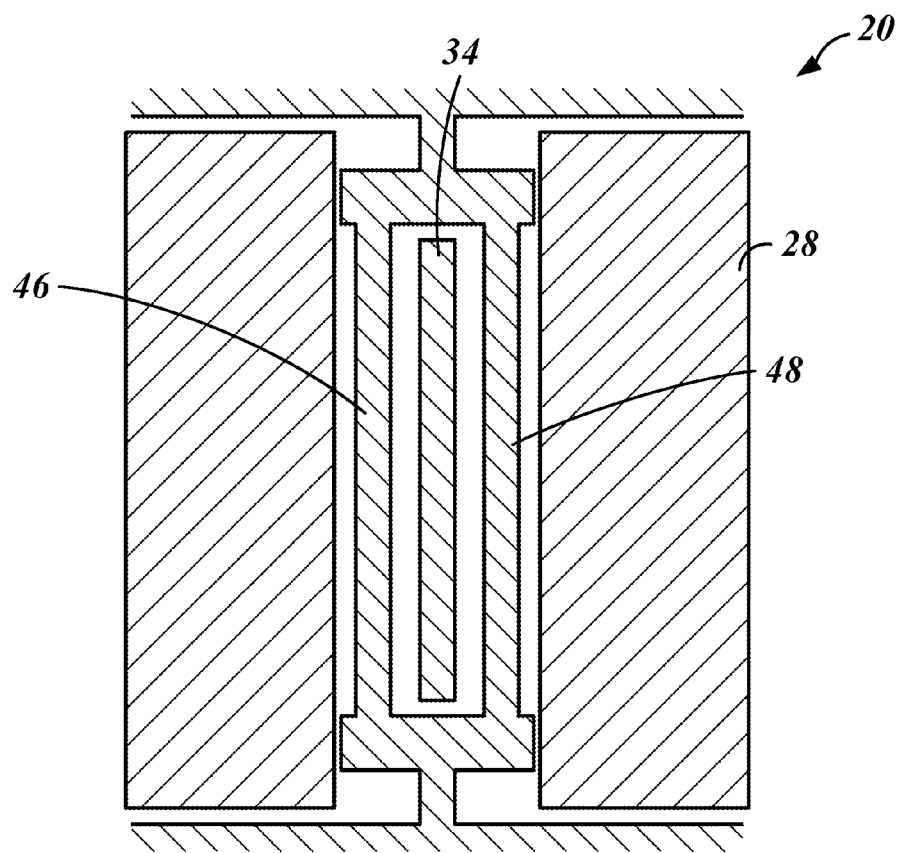
Figures 1, 2:
Figure 2:
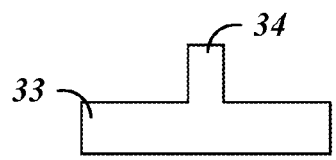
Figures 2, 3:
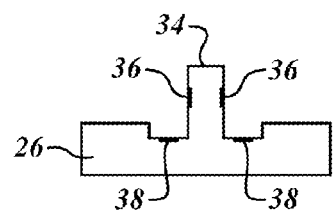
Figures 1, 3:
Figures 2, 3:
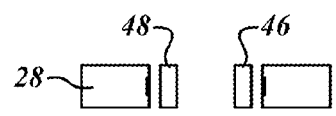
Figures 1, 4:
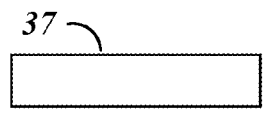
Figures 2, 4:
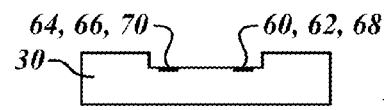

FIGS. 4-1 and 4-2 illustrate an etch and metallization that have occurred from a substrate of quartz 37 to form the top electrode layer 30. A groove is etched into the substrate 37. The material of the top electrode layer 30 is similar to the material used in the other two layers 26, 28. The width of the groove is equal to the width between the side walls of the middle electrode layer 28 and the vertical, outer walls of the gap formed in the lower layer 26. Electrodes (metalized areas 60-70) are then deposited in the formed groove.

Figure 5:
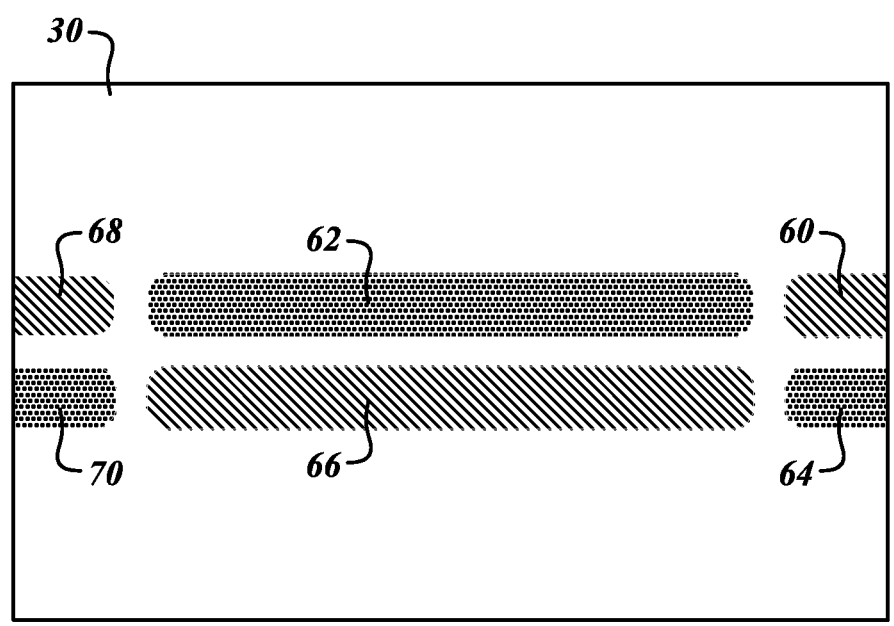
FIG. 5 illustrates a planar view of the underside of the top layer of the DETF shown in FIG. 1-2.

FIG. 5 is a top x-ray view of the top electrode layer 30. On the underside of the top section 30 are six sections of metalized areas 60-70. Three of the metallization areas 60, 62, and 68 share a common axis that is approximately directly over a center axis of the first tine 46. The other three metallization areas 64, 66, and 70 also share an axis that is approximately located directly over a center axis of the second tine 48.

The first and last metallizations 60, 68 that are above the first tine 46 and the center metallization 66 that is above the second tine 48 are configured to hold the same charge. The center metallization 62 over the first tine 46 and the first and last metallizations 64 and 70 over the second tine 48 have the same charge, that is, opposite polarity to the charges on the other metallizations 60, 66, 68. Not shown on the top electrode layer 30 are circuit traces that connect the metallizations of like charge. Also not shown are traces that lead off of the top electrode layer 30 to sources that provide the charge associated with each group of the metallizations. The surface of the bottom layer 26 that faces the bottom surface of the top layer 30 includes a metallization pattern comparable to the metallization pattern on the top layer 30. The bottom layer 26 also includes electrical traces for electrically connecting similarly charged traces.

The walls of the middle layer 28 that are adjacent the tines 46, 48, as well as the walls of the post 34 adjacent the tines 46, 48, include metallization patterns that will hold an electrical charge that is opposite the charge held by the metallizations included in the top and bottom layers 26 and 30. Also not shown within the middle layer 28 and the post 34 are electrical traces for linking the metallizations to a source of electrical charge. This produces electric fields within the tines 46, 48, as shown in FIGS. 7-1 and 7-2.

FIG. 6 illustrates an exaggerated image of a DETF 80 that has been induced to resonate thus deflecting the tines in an out-of-phase manner. The tines are deflected because of the forces produced by the piezoelectric material of the tines. The piezoelectric material either wants to contract or expand based on the direction of an electrical field through the tines. At approximately a center of the tines an elongation force is induced within the tines, due to the production of the electric fields between the metallizations surrounding the tines, as shown in FIG. 7-1. The tines alternately expand outward and inward as a function of the polarity of the applied voltages. If the voltage on the bottom electrode is positive and the voltages on the side electrodes are negative, the tine deflects to the left. Similarly, if the voltage on the bottom electrode is negative and the voltages on the side electrodes are positive, the tine deflects to the right. The electric field alternates between the electrodes in order to change a peizoelectric force between expand and contract.

At upper and lower sections of the tines it is desired to have either a contracting or nonelongating force induced within the piezoelectric material of the tines. Therefore, as shown in FIG. 7-2, the electrical field induced within the tines is opposite of that induced within the tines at the center location (FIG. 7-1).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An accelerometer device comprising:
   a proof mass;
   a support base;
   a hinge configured to flexibly connect the proof mass to the support base;
   at least one double-ended tuning fork (DETF) comprising two tines, wherein the tines comprise only a piezoelectric material; and
   a plurality of electrode surfaces separate from the at least one DETF and surrounding at least three sides of the tines, each electrode surface of the plurality of electrode surfaces comprising at least one electrode separated from at least one of the tines by a respective gap.

2. The device of claim 1, wherein the two tines include a first tine and a second tine, and wherein the plurality of electrode surfaces comprises:
   a bottom section located adjacent a first side of the tines;
   a post received between the tines; and
   a side section located adjacent a second side of the first tine and a second side of the second tine, the side section being planar with the tines.

3. The device of claim 2, wherein the side section, the post, and the bottom section comprise metalized sections located adjacent the tines, the metalized sections defining electrodes.

4. The device of claim 3, wherein the metalized sections are configured to induce an electric field between the side section and the bottom section and between the post and the bottom section.

5. The device of claim 4, wherein a direction of the induced electric field at the first tine is opposite a direction of the induced electric field at the second tine at similar locations along a longitudinal axis of the tines, thereby causing the tines to resonate in-plane and causing the tines to resonate out of phase.

6. The device of claim 5, wherein the metalized sections of each of the side section and the bottom section and the post include three separate metalized subsections, two of the metalized subsections comprising the same electrical charge.

7. The device of claim 3, wherein the plurality of electrode surfaces further comprises a top section comprising a plurality of electrodes.

8. The device of claim 7, wherein the metalized sections are configured to induce an electric field between the side section and the bottom section, between the side section and the top section, between the post and the bottom section, and between the post and the top section.

9. The device of claim 8, wherein a direction of the induced electric field at the first tine is opposite a direction of the induced electric field at the second tine at similar locations along a longitudinal axis of the tines, thereby causing the tines to resonate in-plane and causing the tines to resonate out of phase.

10. The device of claim 9, wherein the metalized sections of each of the side section and the bottom section and the post include three separate metalized subsections, two of the metalized subsections comprising the same electrical charge.

11. The accelerometer device of claim 2, wherein the post is spaced from the first and second tines by a consistent gap.

12. The accelerometer device of claim 1, wherein the tines are made of only the piezoelectric material.

13. The accelerometer device of claim 1, wherein the piezoelectric material is selected from a group consisting of: quartz ($SiO_2$), Berlinite ($AlPO_4$), gallium orthophosphate ($GaPO_4$), thermaline, barium titanate ($BaTiO_3$), or lead zirconate titanate (PZT), zinc oxide (ZnO), and aluminum nitride (AlN).

14. The accelerometer device of claim 1, wherein the electrode surfaces are each defined by quartz and comprise a metalized section.

15. A method of using an accelerometer device comprising:
a proof mass;
a support base;
a hinge configured to flexibly connect the proof mass to the support base;
at least one double-ended tuning fork (DETF) comprising two tines, wherein the tines comprise only a piezoelectric material, and further wherein the two tines include a first tine and a second tine; and
a plurality of electrode surfaces separate from the at least one DETF and surrounding at least three sides of the tines, each electrode surface of the plurality of electrode surfaces comprising at least one electrode separated from at least one of the tines by a respective gap, the method comprising:
inducing a first electric field across the first tine of the DETF attached between the proof mass and the base, the first electric field being located at a first longitudinal section of the tines;
inducing a second electric field across the first tine at a second longitudinal section of the tines;
inducing a third electric field across the second tine of the DETF at a third longitudinal section of the tines;
inducing a fourth electric field across the second tine, the first electric field being located at the first longitudinal section of the tines;
inducing a fifth electric field across the second tine at the second longitudinal section of the tines; and
inducing a sixth electric field across the second tine at the third longitudinal section of the tines,
wherein the first, third and fifth electric fields are similar, and
wherein the second, fourth and sixth electric fields are similar.

16. The method of claim 15, wherein inducing each of the electric fields comprises:
applying a first charge to the at least one electrode; and
applying a second charge to two electrodes located on two electrode surfaces surrounding the tines, the two electrode surfaces being separate from the DETF,
wherein the two electrodes with the applied second charge are located on mutually opposite sides.

17. The method of claim 16, wherein the at least one surface surrounding the tines and the two surfaces surrounding the tines are defined by quartz and each surface comprises a metalized section.

18. The method of claim 15, wherein the tines are made of only the piezoelectric material.

19. The method of claim 15, wherein the piezoelectric material is selected from a group consisting of: quartz ($SiO_2$), Berlinite ($AlPO_4$), gallium orthophosphate ($GaPO_4$), thermaline, barium titanate ($BaTiO_3$), or lead zirconate titanate (PZT), zinc oxide (ZnO), and aluminum nitride (AlN).

* * * * *